INVENTOR
ABRAHAM M. GINDI
BY John F. Ostendorf
ATTORNEY

United States Patent Office 3,491,303
Patented Jan. 20, 1970

3,491,303

INFORMATION DETECTING APPARATUS

Abraham M. Gindi, Poughkeepsie, N.Y., assignor to International Business Machines Corporation, Armonk, N.Y., a corporation of New York Filed June 17, 1965, Ser. No. 464,773
Int. Cl. H03k 5/20
U.S. Cl. 328—112 9 Claims

ABSTRACT OF THE DISCLOSURE

Significant transitions, such as data bits, and auxiliary transitions, such as sync or clock bits, are recovered and segregated from a raw data waveform wherein such transitions are commingled. The detector circuitry includes one portion which is enabled for sensing the auxiliary transitions and another portion which is enabled to detect significant transitions, if any, from the waveform. The two detecting portions are alternately enabled without overlap but in coordination with the raw data waveform.

This invention relates to detecting apparatus and, more particularly, to circuit apparatus for recovering information encoded in a self-clocked data waveform.

Numerous techniques have been developed for representing and recording binary information on a magnetizable medium. This factor is particularly true as data processing speeds have increased, and the need for higher density magnetic recording has correspondingly increased. One of these techniques provides for the magnetizable medium of the binary storage system to be magnetized continuously in one direction or the other. The magnetization is indicative of the clocking and the binary data. Electric signals representative of the information are transduced which have significant and auxiliary signal transitions in a raw data waveform. Forms of this recording technique are known as phase encoded and double frequency recording.

In high density recording systems using this technique, severe shifting of the recorded data bits occurs due to the magnetic crowding and effects produced by the electric circuits in the process of recording and sensing the data. The need exists for circuitry to separate the significant transitions indicative of one form of information from the auxiliary transitions indicating another form of information from the auxiliary transitions indicating another form of information despite severe shifting of the transitions from their normal positions in time.

Accordingly, it is a general object of the invention to provide circuitry for recovering significant and auxiliary signal transitions transduced from a recording medium in a storage system.

Circuits have been proposed for use in a phase encoded recording system to sample for the significant transitions in a raw data waveform to separate them from the auxiliary transitions. One such arrangement is described in pending application, Ser. No. 245,529, filed on Jan. 4, 1963, now Patent No. 3,217,183, in the names of Brunschweiger et al., entitled Binary Data Detection System and assigned to the same assignee as this invention. In that detection system, circuitry is provided for generating a constant phase reference signal synchronized at the same frequency as the signal waveform representing the data. The data and reference signals are combined to produce a signal for sampling for the significant transitions over the entire nominal bit period.

Other schemes have been proposed for use in decoding double frequency encoded information. In these schemes a fixed time period is established for sampling for the presence of a significant transition. Neither of the above circuit schemes is capable of accommodating large shifts of the significant and auxiliary transitions in the raw data waveform.

Thus, it is an object of the invention to provide circuitry for separating significant and auxiliary transitions in a self-clocked raw data waveform transduced from a storage medium by controlling the occurrence of the detection periods for each type of transition.

It is another object of the invention to provide apparatus which establishes a detection period for the significant transitions whose beginning and termination are controlled in accordance with an indicia of the raw data.

A further object of the invention is to provide circuitry for separating the information in a raw data waveform which accommodates severe shifting of the significant and auxiliary waveform transitions from their nominal positions in time.

A more specific object of the invention is to provide circuitry for use in a double frequency recording system for separating the transitions indicative of the data bits from the transitions indicative of the clock bits in a raw data waveform.

Another specific object of the invention is to provide circuitry for use in a phase encoded recording system for separating the transitions indicative of the data/clock bits from the unwanted transitions of the raw data waveform.

In accordance with an aspect of the invention, there is provided circuit detecting apparatus for recovering information from a raw data waveform transduced from a storage medium and having significant and auxiliary transitions self-clocked into nominally fixed time periods. The circuit apparatus comprises first means for providing manifestations of the significant transitions and second means for providing the manifestations of auxiliary transitions. The first and second means are interconnected and responsive to an indicia of the raw data waveform, so that only one of the means is operative for detecting a transition at a particular time of the time period. Circuit means are also provided for responding to an indicia of the raw data waveform and for controlling the occurrence of the detecting operation of the first and second means in accordance with the waveform.

A feature of the invention provides for the establishment of a detection period for the significant transitions. The period is variably controlled in occurrence and duration by oscillator circuit means acting in synchronism with an indicia of the raw data waveform. The circuit means operate to permit the detection period to begin after an auxiliary transition is terminated and to prevent the termination of the detection period until a significant transition terminates or if no significant transition is detected, until after a predetermined period has passed.

Another feature of the invention provides for the use of gate-latch circuits for responding to the leading edges of the transitions of the raw data waveform under the control of the oscillator circuit means to separate the significant and auxiliary bits.

The foregoing and other objects, features and advantages of the invention will be apparent from the following more particular description of the preferred embodiments of the invention, as illustrated in the accompanying drawings, wherein.

Figure 6:
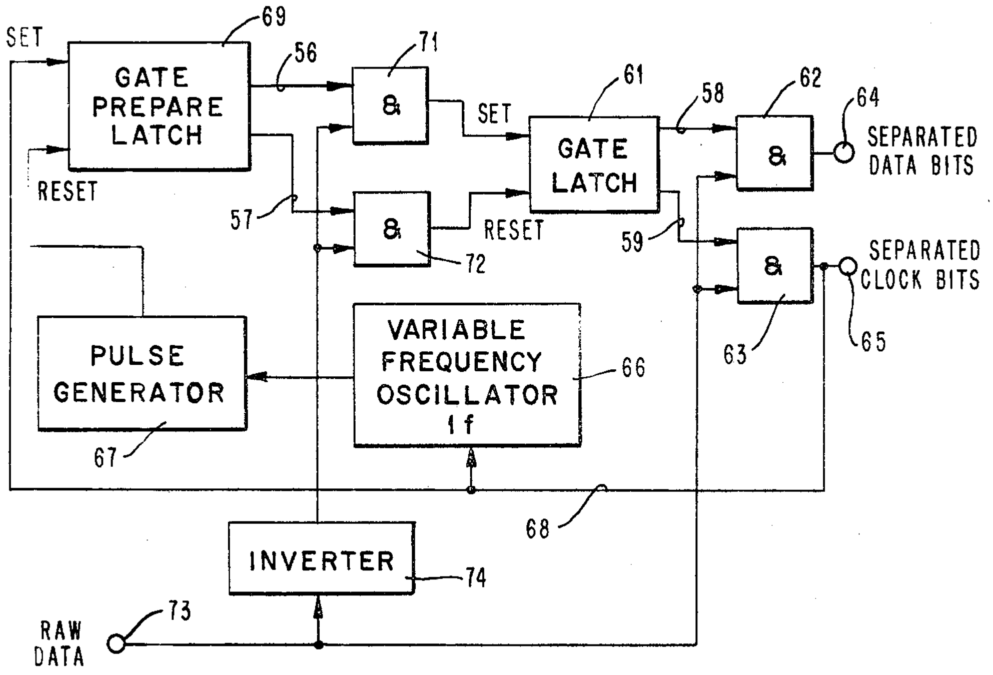
Figure 7:
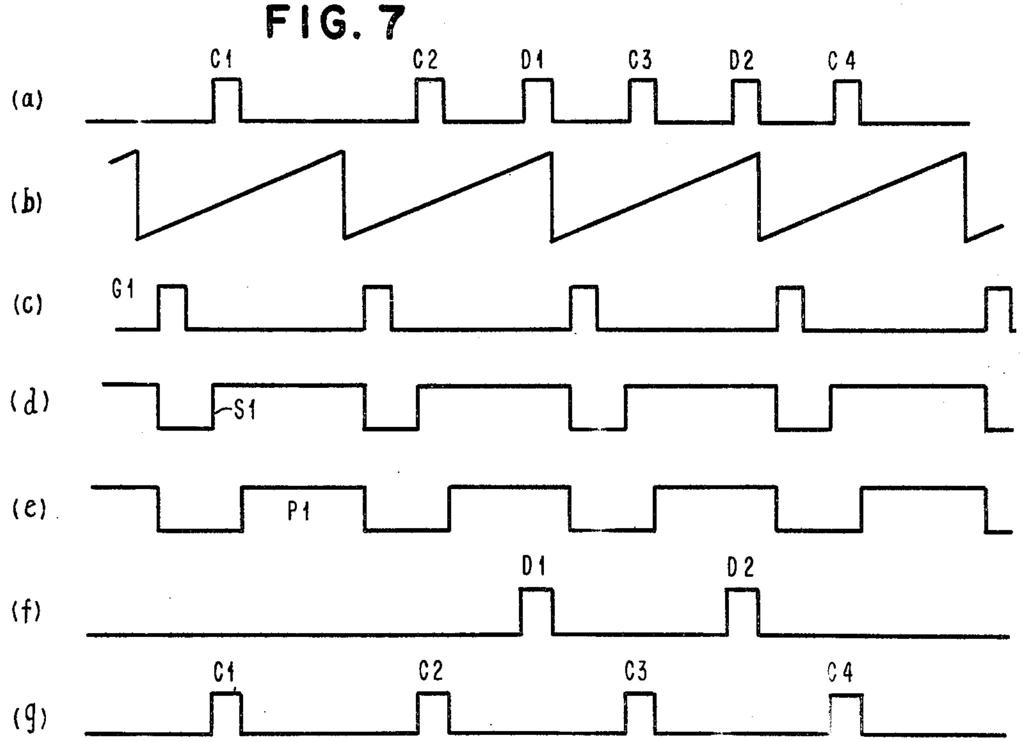
Figure 8:
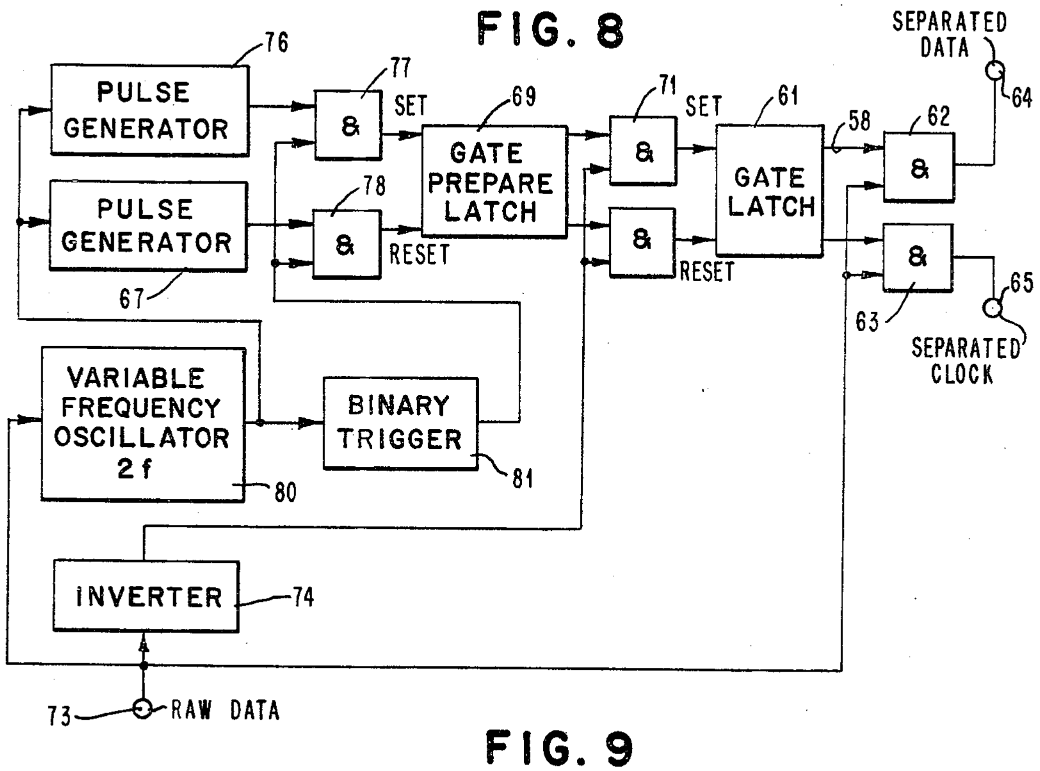
Figure 9:
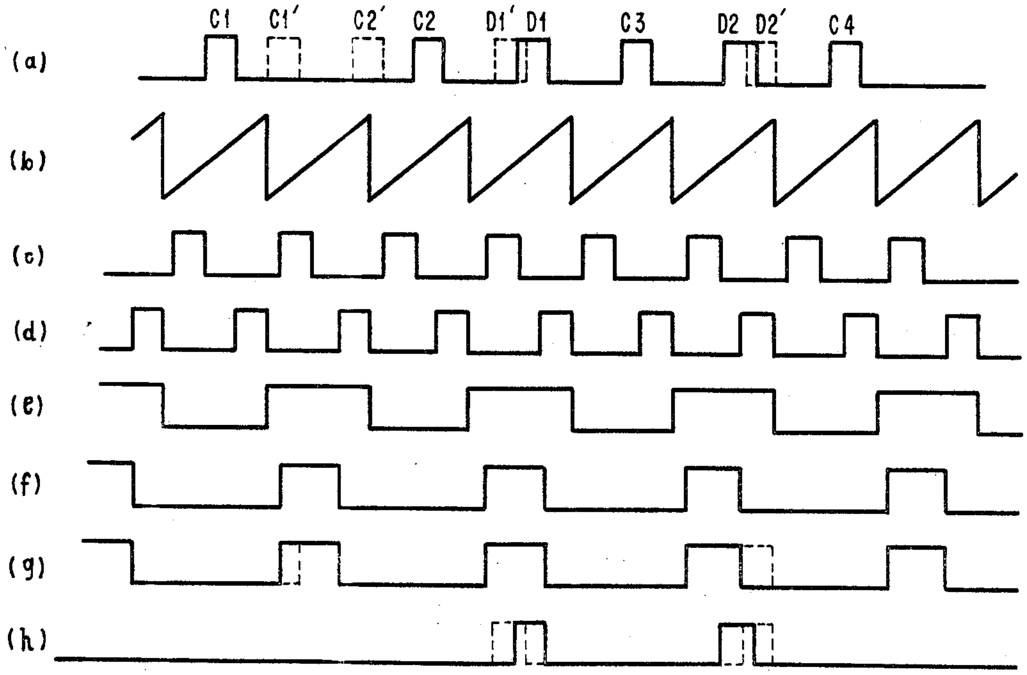

FIGS. 6 and 8 are schematic circuit diagrams of single and double boundary data-clock separating systems for use with a recording system having double frequency encoded information; and, FIGS. 7 and 9 are waveform diagrams illustrative of the operation of the systems of FIGS. 6 and 8, respectively.

Figures 1, 2:
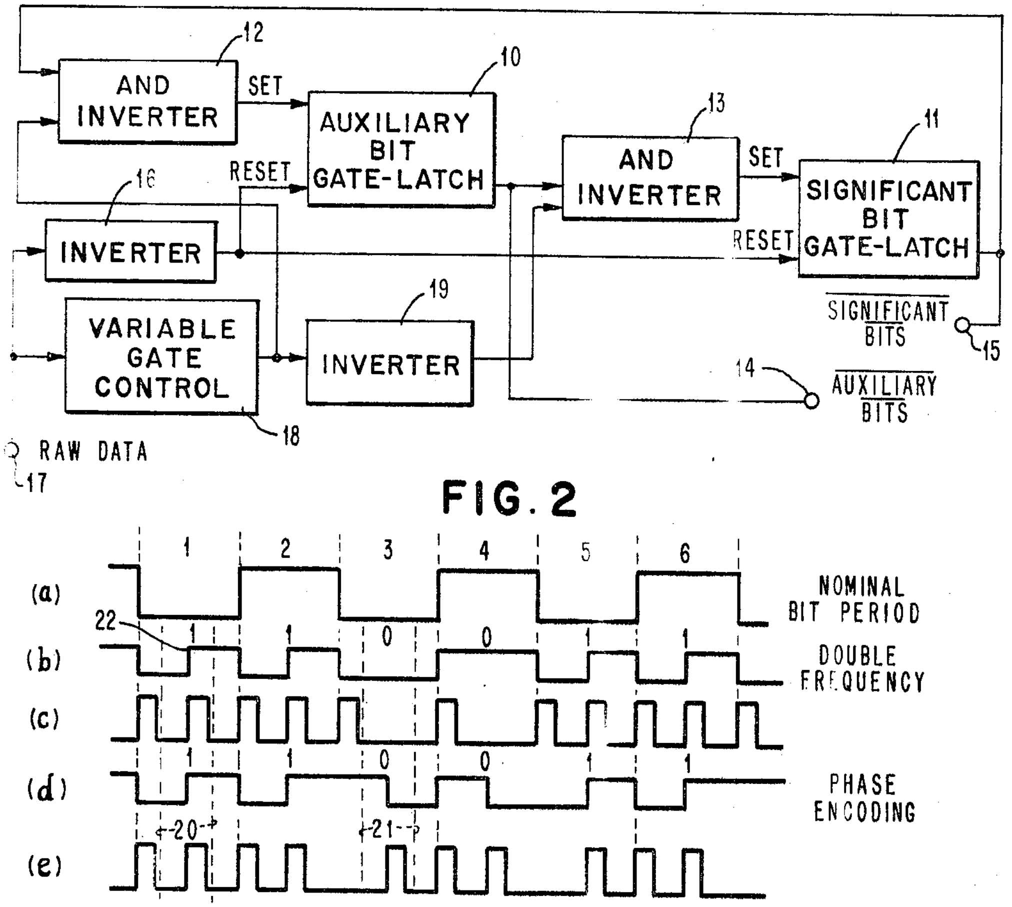
FIG. 1 is a schematic circuit diagram in generalized form of the information recovering apparatus embodying the principles of the invention.
FIG. 2 is a waveform diagram illustrating the types of data encoding which can be separated with the apparatus of FIG. 1.

Referring now to FIG. 1, a generalized circuit is provided for recovering information from a self-clocked raw data waveform. The waveform has significant and auxiliary transition or crossovers. Dependent on the type of information encoding in the waveform, these transitions are indicative of data, clock or other bits of information. The relationship of the transitions to the various aspects of information will be more apparent from the description of the circuitry of FIG. 1.

The circuitry generally comprises a pair of gate-latch circuit arrangements. Each of these circuit arrangements comprises a gate-latch 10, 11 and a corresponding combinatorial logic circuit, such as the AND inverters 12, 13, respectively. Each latch circuit includes a monostable element for each output state of the circuit. Feedback paths interconnected the elements of the circuit, and an input line is provided for each state of operation. To set the circuit into a particular state, the input associated with that state is activated. Repeated operations of the same input have no effect on the output state of the circuit. To effect a change of circuit output state, one of the other inputs must be activated or one of the feedback paths of the circuit must be interrupted. An example of a simple latch circuit is an AND inverter logic circuit having its output connected to the input of a second AND inverter. The output of the second circuit is connected, in turn, to the input of the first circuit.

The gate-latch circuits in FIG. 1 each have two inputs and, therefore, act as bistable circuits. Only one of the outputs from each circuit is employed, and, in each instance, it is the OFF or reset circuit output. The circuit 10 provides output signals or manifestations (bits) indicating the auxiliary transitions of the raw data waveform at an output terminal 14. Correspondingly, the circuit 11 provides output signals or manifestations (bits) of the significant transitions in the raw data waveform at the terminal 15. The raw data is supplied at an input terminal 17 and is inverted at 16 to be supplied as the reset input for the circuits 10, 11. Thus, reset of these circuits occurs when the raw data is not present.

Each of the gate-latch circuits 10, 11 is set into operation in response to the combined effects of the output of the other gate-latch circuit and an indication provided from a variable gate control circuit 18. Combining of these signals is performed by the AND inverters 12, 13. In the case of the auxiliary bit gate-lach circuit arrangement, the signal supplied from the variable gate control circuit is in true form whereas the signal supplied to the significant bit gate-latch circuit arrangement 11 is first inverted at 19. The variable gate control circuit 18, which will be described more fully hereinafter, operates in response to the raw data waveform supplied at the input terminal 17. It is operative to control the occurrence and duration of the detection periods for the auxiliary transitions and the significant transitions.

As already stated, the principles of the invention are applicable to the recovery of the various aspects of information from self-clocked data waveforms having nominal bit periods. In FIG. 2*a* the termination of one bit period and the beginning of the next bit period are indicated as occurring with each transition of the waveform. When information is encoded in a waveform substantially conforming to these nominal bit periods, it can be separated by the circuitry shown in FIG. 1. Although the principles of the invention are described with signal transitions, it should be understood that the circuits operate in response to the leading edges of pulses. As long as the leading edge of a pulse occurs, then the circuits remain in a latched state until the pulse terminates. The use of transitions is provided to facilitate the description and should not be regarded as a limitation of the scope of the invention.

In FIG. 2*b*, the waveform in transition form is encoded with information in a double frequency system of encoding. A double frequency recording system of the magnetic type requires one flux reversal of the magnetic storage medium in a bit period for representing one binary state and two flux reversals in a bit period for representing the other binary state. As shown in FIG. 2*c* in pulse form, these flux reversals are detected by a transducer, amplified and converted into discrete pulses which can be supplied as the raw data waveform at the terminal 17. The transitions of FIG. 2*b*, occurring at regular intervals, define the beginning and end of each bit period. They are referred to as clock bits. The transitions occurring between the clock bits contain the binary information and are referred to as the data bits. The presence of a transition (data bit) between two clock bits is ordinarily defined as a binary one, whereas the absence of a transition is defined as a binary zero. A series of zeros is represented by a series of block bits only and a series of ones is represented by clock bits and data bits interweaved.

In the circuitry of the invention, separation of the binary information from the remainder of the raw data waveform is desired. When the circuit of FIG. 1 is employed in a double frequency decoding system the significant bits provided at 15 correspond to the binary information, whereas the auxiliary bits provided at 14 correspond to the clock bits of the double frequency encoded waveform of FIGS. 2*b* and 2*c*. The binary information stored in the six bit periods 1–6 is: 110011. This waveform corresponds to the raw data waveform supplied at the input terminal 17 of FIG. 1.

To accommodate shifting of the time of occurrence of the clock bits and the data bits from the nominal time, the circuitry of the invention establishes a detection period for the data bits. This period is indicated at 20 and 21 between the dotted lines in the first and third bit periods. The beginning of the detection period occurs only when the clock bit immediately preceding a possible data bit has terminated. This control is established by the output connection from the gate-latch circuit 10 to the AND inverter 13.

In the initial operation of the circuit of FIG. 1, the significant bit gate-latch 11 is in the OFF condition providing a signal through the feedback connection to AND inverter 12. An output is also provided from control circuit 18 enabling AND inverter 12 to set gate-latch 10. The first transition of the waveform of FIG. 2*b* is assumed to be a clock bit. When it occurs, the reset of gate-latch 10 is removed, providing a manifestation of an auxiliary transition (clock bit) at terminal 14. At the same time, the output from gate-latch 10 is provided to AND inverter 13, degating it for the duration of the clock bit. Eventually, the output from the variable gate control circuit 18 changes to an OFF condition. It is inverted at 19 to enable the AND inverter 13. The beginning of the detection period or window 20 in bit period 1 is established for a significant transition, such as the data bit 22 in the double frequency encoded waveform of FIG. 2*b*. When bit 22 occurs, the reset of gate-latch 11 is removed to provide an output manifestation at terminal 15 indicating the presence of the significant transition. This manifestation of a significant transition occurs only after the gate-latch 11 is set and the reset is removed. This is the OFF output from the gate-latch circuit. The ON output is not employed for separating the information from the raw data waveform.

If a significant transition (data bit) does not occur in the detection period, for example, period 21 in bit period 3, then gate-latch 11 has a constant reset, thereby preventing any output manifestation from occurring at terminal 15. However, by the end of the period 21, the variable gate control circuit 18 changes its output level to an ON condition which is inverted at 19 to remove the set signal provided by AND inverter 13 to the gate latch 11. It should be understood that no output can occur at the OFF side of a gate-latch circuit if it has concurrent set and reset signals. An output occurs only when it has a set signal and no reset signal.

Operation in this manner continues for each nominal bit period 1–6, so that the clock bits are provided at terminal 14 and the data bits at terminal 15. An output is provided by a gate-latch circuit each time that the circuit is set and the reset is removed. If the raw data waveform departs from the nominal bit period of time, so that the clock bits are advanced in time or delayed in time, or the data bits are similarly displaced, this circuit comprensates for this distortion by delaying the set or reset of each latch circuit until the expiration of the previous bit, should the detection period end or begin before the expiration of the previous bit. This provides instantaneous compensation for individual bits.

Long term compensation is accomplished by supplying the raw data waveform at input terminal 17 to the variable gate control circuit 18. Circuit 18 is synchronized with the raw data waveform so as to operate at the same frequency and phase as the preceding raw data waveforms. The variable gate control circuit is adjusted by the waveforms to move the detection periods in time (phase) as well as in duration (frequency). In this way each significant and auxiliary transition is recovered from the raw data waveforms, such as the phase encoded waveform matically detected by this circuit.

As already stated, the circuitry of the invention may also be employed for detecting other types of self-clocked data waveforms, such as the phase encoded waveform shown in transition form in FIG. 2*d* and in pulse form in FIG. 2*e*. This waveform has the same data constituency as the double frequency encoded waveform of FIGS. 2*b* and 2*c*, that is, the data contained in the bit periods 1–6 of this waveform is: 110011. In a phase encoded waveform a significant transition always occurs in substantially the center portion of the nominal bit period. An auxiliary or secondary transition occurs at the beginning or end of a bit period, dependent on the preceding and succeeding significant transitions. The transition occurring in the center portion of the bit period carries both the clock and the data information. The phase of the transition determines the particular information stored. Thus, a downward transition for the signal transition or crossover is usually indicative of a binary 0 and an upward transition is usually indicative of a binary 1. The transitions that occur at the beginning and end of a bit period are present only to permit the transition in the center portion of the bit period to occur in the correct direction.

When decoding information from a phase encoded waveform, it is necessary to separate the data/clock transitions from the auxiliary or secondary transitions. The circuitry of FIG. 1 is employed for separating and decoding a phase encoded waveform. In addition, the additional circuitry of FIG. 3 must be connected to the circuit of FIG. 1. In this apparatus, the raw data waveform is supplied to a phase sensitive trigger circuit 23 which may be a conventional Schmitt trigger having outputs indicating positive and negative transitions provided on the lines 24 and 25, respectively. The output on line 24 is directly supplied to an AND circuit 26 which also receives the significant bit output at 15 in the circuit of FIG. 1. The output provided on the line 25 is the inverse of the information on line 24 and is supplied to an AND circuit 28 along with the significant bit output at 15 in FIG. 1. The AND circuits 26 and 28 provide the 1 and 0 information bits at the terminals 31 and 32, respectively, from the significant transitions recovered from the raw data waveform.

In recovering the information from a phase encoded waveform, as shown in FIGS. 2*d* and 2*e*, the transitions that occur in the center portion of the bit period are provided at the significant bit output terminal 15. The transitions occurring at the beginning and ending times of the nominal bit period, such as that shown at 21 at the end of the bit period 3, are provided at the auxiliary bit terminal 14. The phase sensitive trigger 22 responds to the phase of the significant transitions in the raw data waveform to detect the presence of the 1 bits by the upward transitions and the 0 bits by the downward transitions.

The variable gate features of the invention are also applicable to the recovery of information of a phase encoded waveform. Thus, the detection periods, for example as indicated at 20 and 21, are movable to accommodate for long term variations of phase and frequency occurring in the raw data waveform. The variable gate control circuit 18 responds to the raw data waveform to control the occurrence of the beginning and ending times for these detection periods as well as the duration of the period. Instantaneous compensation for bit shift and distortion of individual bits is accomplished by the two latch circuits in the same manner as described for the double frequency encoded waveform.

The variable gate control circuit 18 may take many forms. For example, it may be a variable frequency oscillator operating with a pulse generator and a gate prepare latch to control the occurrence of the detection period. The variable frequency oscillator may operate at twice the frequency of the nominal bit period and, therefore, act with a pair of pulse generators to control the beginning and termination of the detection period for the significant transitions, or, it may operate at the same frequency as the nominal frequency to control the termination of the detection time. Another variation provides for the variable frequency oscillator to operate at twice the bit frequency with a ramp gate generator and a binary trigger. Each of these modes of operation is described more particularly in conjunction with the circuits of FIGS. 4, 6 and 8.

Figure 3:
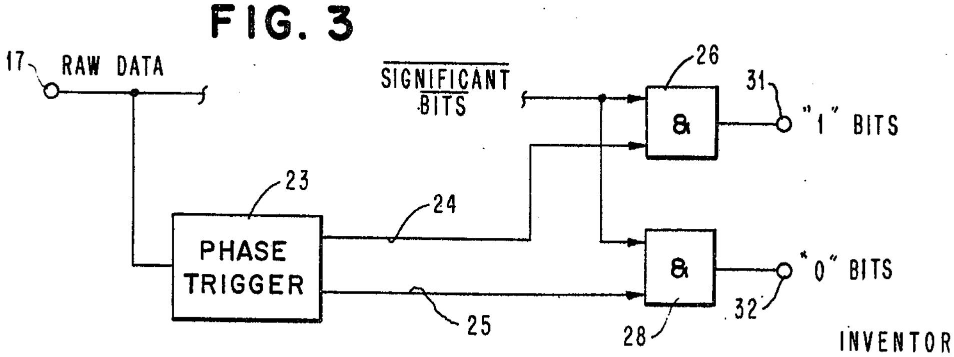
FIG. 3 is a schematic circuit diagram of circuitry for use with the apparatus of FIG. 1 in recovering information that is phase encoded.
Figure 4:
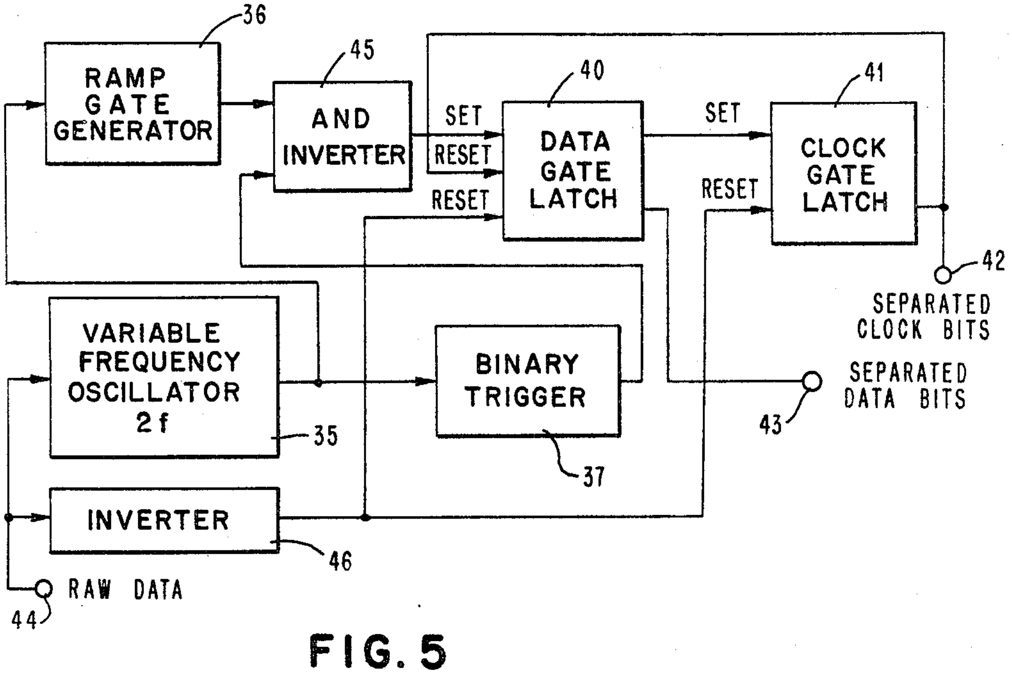
FIG. 4 is a schematic diagram of a particular form of detecting apparatus for use in recovering double frequency encoded information.

Referring to FIG. 4, a data-clock separating circuit arrangement is shown employing a ramp gate generator 36 and binary trigger 37 with the variable frequency oscillator 35 operating at double the nominal frequency. This arrangement is described in conjunction with a double frequency encoding system. However, it should be understood that this arrangement, along with the arrangements of FIGS. 6 and 8, may be modified as shown in FIG. 3 for use with other types of self-clocked data waveforms such as the phase encoded waveforms of FIGS. 2*d* and 2*e*.

In the arrangement of FIG. 4, the gate-latch logical circuitry is optimized. The data and clock gate-latches 40 and 41, respectively, are interconnected. The output from clock gate-latch 41 which is the OFF output of this latch provides the separated clock bits at an output terminal 42 and acts as one reset input for the data gate-latch 40. The data gate-latch 40 provides the separated data bits from its OFF output at the terminal 43. At the same time the ON output from latch 40 acts as the set input for latch 41 when the data gate-latch is off. The raw data supplied at the input terminal 44 and inverted at 46 acts as the reset for both of the latches 40 and 41 except when a data or a clock bit is present. The data gate-latch 40 is also set from AND inverter 45 which responds to the outputs provided by the ramp gate generator 36 and the binary trigger 37.

In FIG. 5a, the raw data waveform is shown. The solid line pulses indicate data and clock transitions occurring at the normal time. The dotted line pulses indicate data and clock transitions shifted out of the normal time position, but within the ability of the circuit to separate the data and clock bits. In the initial operation of the circuit, latch circuit 41 is assumed to be in the set condition. When clock signal C1 occurs, the reset of latch circuit 41 is removed to provide an output indicating the clock bit at terminal 42. This bit is shown as the separated clock bit C1 of FIG. 5*f*. This signal is also applied to reset latch circuit 40. Before the detection period for the significant transition or data period begins, latch circuit 40 must be set by the output of AND inverter 45. This output is produced in response to the signals from the variable frequency oscillator timing circuitry.

Variable frequency oscillator 35 is arranged to operate at substantially twice the nominal frequency of the bit period. It provides two sawtooth ramp signals for each bit period. Ramp gate generator 36 responds to a predetermined level of these signals to provide rectangular pulses to AND inverter 45. The generator 36 is a threshold device which can be adjusted by altering the internal parameters of the circuit, thereby controlling and adjusting the time of occurrence for the data detection period. At the same time, binary trigger 37 responds to the ramp signal outputs from the variable frequency oscillator 35 to change state once during each ramp cycle. When this occurs, a single pulse per bit period is provided to the AND inverter 45. AND inverter 45 is enabled to provide the other set input for the data gate-latch circuit 40 once during each nominal bit period.

To synchronize the variable frequency oscillator 35, it is connected to receive the raw data waveform at the input terminal 44. The oscillator is a free-running oscillator which has its frequency and phase controlled by the transitions of the raw data waveform. The synchronizing transistions are compared to the oscillator signal and a correction voltage is generated in the oscillator that adjusts the output frequency and phase so as to keep it in phase and frequency with the raw data waveform.

Figure 5:
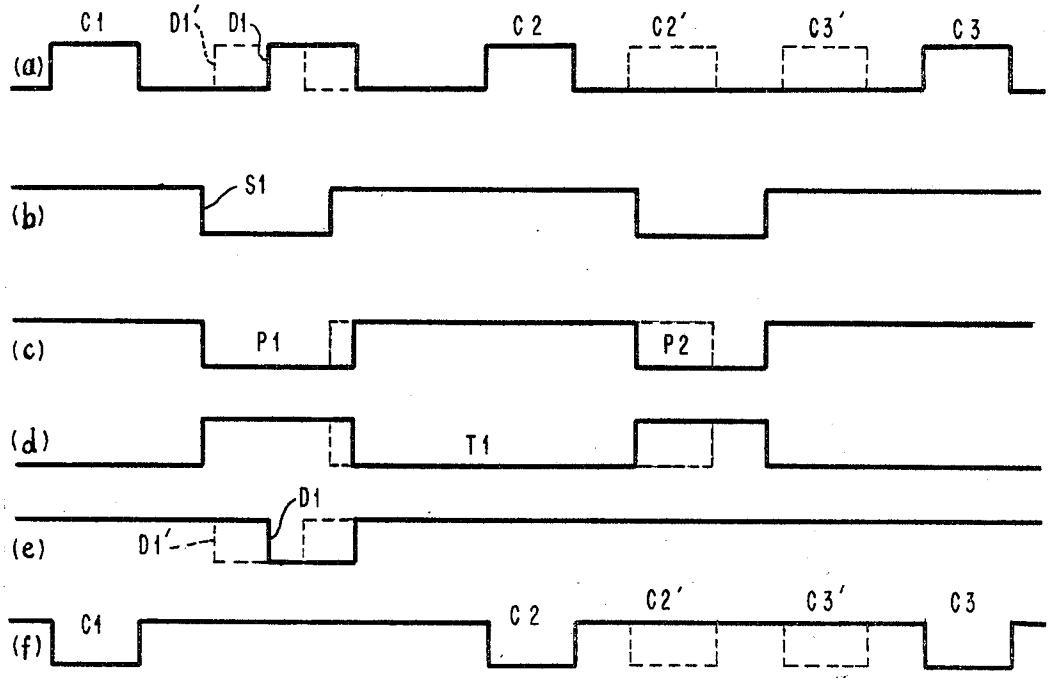
FIG. 5 is a waveform diagram for use in describing the operation of the apparatus of FIG. 4.

By the time that the first data bit (D1 of FIG. 5*a*) is received, the data gate-latch circuit 40 is set by AND inverter 45. This aspect of operation is shown at S1 of FIG. 5*b*. Waveforms *c* and *d* indicate the detection periods for the data and clock transitions, respectively. When the waveform is at its lower level the latch circuits are able to detect the occurrence of a transition that occurs in the raw data waveform. Although the waveform diagram of FIG. 5 shows pulses rather than transitions, the term transition is employed in describing the operation of the circuit, since the circuitry is responsive to the leading edge transition of a pulse. It will be apparent from the following description that as long as the leading edge occurs, the circuit remains in a latched condition until the entire pulse terminates.

Data gate-latch circuit 40 is set to detect data bit D1. Since this bit is slightly delayed from its nominal bit position, the detection period is extended until the data bit terminates. This is shown at P1 in waveform *c*. Normally, the period should end where the dotted line is illustrated. However, due to the delay of D1, the detection period P1 ends only when D1 terminates. This prevents the clock gate-latch circuit 41 from being set into its detection period (waveform *d* of FIG. 5—T1.) In similar manner, it is prevented from beginning detection until it is set when the ON output of data gate-latch circuit 40 goes down.

The data bit detected in period P1 is indicated at D1 on waveform *e* of FIG. 5. It is provided at terminal 43. If the data bit is advanced in time, as shown by the dotted configuration D1′ in waveform *a*, so as to occur after the detection period P1 begins, then it is detected and separated as a data bit at terminal 43. It is indicated at D1′ in waveform *e*.

The same detection and separation operation occurs for clock bits. Thus when the second clock bit C2 of waveform *a* occurs in its normal time period T1 it is provided at terminal 42 and as shown in waveform *f*. However, if this clock bit is delayed as shown by the dotted line C2′ (waveform *a*), then the detection period is also delayed as shown by the dotted line in waveform *d*. The clock bit is provided at C2′ in waveform *f*. The data gate-latch circuit 40 is prevented from beginning detection as shown by the dotted line for detection period P2 in waveform *c*. Circuit operation is the same if the clock pulse is advanced in time as shown by the clock pulses C3 and C3′.

Thus, this circuit is responsive to the control established by the variable control circuitry including the variable frequency oscillator, binary trigger and ramp gate generator to provide variable data gate and clock gate detection periods. The periods have their durations extended as well as their opening and closing times determined by the synchronism which is maintained between the variable control circuitry and the raw data waveform.

Referring now to FIG. 6, a single boundary separation system is shown for providing data bits and clock bits in a double frequency encoded recording system. A single latch circuit 61 provides the gating for the data and clock bits. Its ON and OFF outputs, 58 and 59, are provided to a pair of AND gates 62 and 63, respectively, which provide the data bits and clock bits at output terminals 64 and 65. This latch circuit may also take the form of two AND inverter circuits having their respective outputs connected as inputs to the other AND inverter circuit.

The variable control circuitry for this embodiment of the invention includes a variable frequency oscillator 66 operating to provide a single ramp output signal (waveform *b* of FIG. 7) for each nominal bit period. This ramp output is supplied to a pulse generator 67 which responds at a predetermined threshold level to provide the reset for a gate prepare latch 69.

The variable frequency oscillator 66 responds to a separated clock bit provided through the connection 68 from the output terminal 65. Through this connection, the variable frequency oscillator 66 is maintained in synchronism with the frequency and phase of the raw data waveform or an indicia of it. The separated clock bit is also provided as the set input to the gate prepare latch 69.

The gate prepare latch 69 has its ON output 56 connected through an AND gate 71 to the set input of the gate-latch 61. The OFF output 57 of the gate prepare latch 69 is connected through AND gate 72 to the reset input of gate-latch 61. The AND gates 71 and 72 are enabled by the complement of the raw data waveform supplied at input terminal 73 and inverted at 74. The raw data is supplied directly to enable the AND gates 62 and 63.

In operation, if it is assumed that both of the latches 69 and 61 are in the reset state, then AND gate 63 is conditioned to provide a clock bit at 65 when one is provided in the raw data waveform as shown at C1 in waveform *a* of FIG. 7. The first bit that is recognized, therefore, must be a clock bit. This clock bit (C1 of waveform *g*) is supplied through connection 68 to set the gate prepare trigger 69 (S1 of waveform *d*) and to synchronize the variable frequency oscillator 66. The gate prepare trigger conditions AND gate 71 which eventually sets the gate-latch 61. However, at this time AND gate 71 is blocked by the presence of the clock bit at the raw data waveform input 73. When clock bit C1 terminates, AND gate 71 is fully conditioned to set gate-latch 61 (P1 of waveform *e*). Gate-latch 61 provides an ON output at 58 to condition AND gate 62 which provides the separated data bits at the terminal 64. Thus, the next bit that can be recognized in the raw data waveform (waveform *a*, FIG. 7) is a data bit (D1 and D2 of waveform *a*), if it occurs before the gate prepare latch 69 is reset by the output of the pulse generator 67. The separated data bits are shown at D1 and D2 of waveform *f*.

As shown in waveform *b*, the variable frequency oscillator 66 operates at a single frequency to provide the ramp output. This output drives the pulse generator 67 which is set to respond at a given threshold to provide its resetting output (waveform *c* of FIG.7) for the gate prepare latch 69. These circuits establish the single boundary of this separation system. The leading edge G1 of the pulse generator output forms a boundary between the leading edges of each data bit and the following clock bit. The width of this boundary is determined by the electrical characteristics of the circuits involved and the accuracy of the pulse generator timing.

The output of the pulse generator 67 resets gate prepare latch 69. This occurs when it can be safely said that if the data bit has not been detected, then it is not present in this bit period. There is no opportunity for splitting a bit in half. When the leading edge of a delayed data bit appears immediately before the pulse generator 67 resets the gate prepare latch 69, the gate-latch 61 is not reset because AND gate 72 which provides the reset pulse is disabled by the presence of the data bit at the raw data waveform input 73.

Waveform *d* of FIG. 7 shows the resetting of the gate prepare latch by the pulse generator output signal. The detection time for data gate-latch 61 is shown as waveform *e* of FIG. 7. Latch 61 remains in the set state until the end of a data bit should the data bit be late. If the data bit is early or occurs at the correct time, then gate-latch 61 is reset immediately after the gate prepare latch 69 is reset by the pulse generator 67. If no data bit occurs in the raw data waveform, such as between clock bits C1 and C2, and the following clock bit occurs early in time, the second clock bit is correctly separated as long as the leading edge of the clock bit appears after the gate prepare latch 69 is reset by the pulse generator.

In the single boundary separation system of FIG. 6, no boundary is established between each clock bit and the following data bit. All that is required is a minimum amount of time between the trailing edge of the clock bit and the leading edge of the following data bit, i.e., a period of time sufficient to set the gate-latch 61. This may occur at any time during the first part of the bit period. Since there is no boundary in the first half of the bit period, a data bit can be earlier in one bit period.

In the single boundary system a distinct boundary is maintained in the second half of the bit period between the trailing edge of the data bit and the leading edge of the next succeeding clock bit in order to identify them correctly. This system accomplishes that purpose by controlling the terminating time for the detection of a data bit in accordance with the phase and frequency of an indicia of the raw data waveform. This indicia is the separated clock bits.

In FIG. 8, a double boundary separation system is shown. It is substantially the same system as employed in the arrangement of FIG. 6 except that the gate prepare latch 69 is set from a second pulse generator 76 which operates through an AND gate 77, and the variable frequency oscillator operates at twice the frequency of the nominal bit period.

The pulse generator 67 resets gate prepare latch 69 through AND circuit 78. Both of the pulse generators respond to the output of a variable frequency oscillator 80 which operates at twice the frequency of the nominal bit period. Thus, it provides two ramp output waveforms for each nominal bit period (waveform *b* of FIG. 9.)

The AND gates 77, 78 are enabled by the output of binary trigger 81 which responds to the variable frequency oscillator 80 in the same manner as described for the circuit of FIG. 4. The outputs of pulse generators 76 and 67, binary trigger 81 and gate prepare latch 69 are indicated in waveforms *c*, *d*, *e* and *f*, respectively. The variable frequency oscillator is synchronized by directly accepting the raw data waveform (waveform *a*) which is provided at input terminal 73.

The circuit of FIG. 8 operates in substantially the same manner as the circuit of FIG. 6 to provide the separated data bits (waveform *h*) at terminal 64, except that the gate prepare latch 69 is set by pulse generator 76. The pulse generator is adjusted so that no data bits begin before it. If a late clock bit is still present (C1′ of waveform *a*) the detection period for a data bit (waveform *g*) does not begin until the clock bit terminates. Hence, the same variable data gate feature is employed in the first half of the bit cell as has been employed in the second half of the bit cell in the circuit of FIG. 6.

This arrangement permits the boundaries for the detection of the data bits to shift more than is permissible with a fixed detection time arrangement. In a fixed detection time arrangement, the pulse width of the clock and data bits must be taken into consideration in determining the efficiency of the separation system. This limits the application and the efficiency of the separation system. A smaller amount of bit shift can be tolerated than in the variable detection time systems of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Detecting apparatus for recoversing and segregating information from a raw data waveform having both significant transitions such as data bits and auxiliary transitions such as sync or clock bits, comprising first means for providing manifestations of the significant transitions, second means for providing manifestations of the auxiliary transistions, means coordinated with at least the auxiliary transitions for alternately conditioning said first and second means for detecting transitions associated therewith during periods of time within which such transitions should occur, and means interconnecting said first and second means and operable during detection of a transition by either of said first and second means for preventing the conditioning of the other of said first and second means until completion of a transition detection that has already been initiated.

2. Detecting apparatus for recovering and segregating information from a raw data waveform having both significant transitions such as data bits and auxiliary transitions such as sync or clock bits, comprising first means for providing manifestations of the significant transitions, second means for providing manifestations of the auxiliary transistions, means for conditioning either of said first and second means to the exclusion of the other for detecting a waveform transition associated therewith at a particular time, means coordinated with said auxiliary transitions for causing said conditioning means to condition said second means for detecting auxiliary transitions during periods of time within which said auxiliary transitions should occur, and means coupled to the output of said second means for causing said conditioning means to condition said first means in response to an output from said second means.

3. The apparatus of claim 2, which further includes means responsive to the raw data waveform for preventing said conditioning means from changing the conditioned state of either of said first and second means for the duration of any significant or auxiliary bit in said raw data waveform.

4. Apparatus for detecting transitions indicative of data and clock bits of information in a double frequency encoded waveform, comprising
- a first gate-latch circuit arrangement for providing indications of the data bits,
- a second gate-latch circuit arrangement for providing indications of the clock bits,
- means for supplying the waveform to the first and second gate-latches,
- means for intercoupling said first and second gate-latches to permit only one of the gate-latches to be operative for detecting a transition at a particular time, said intercoupling means being constructed and arranged for preventing the enabling of either of said gate-latch circuits until completion of a transition detection that has already been initiated by the other said gate-latch circuit, and
- variable gate control circuit means responsive to the waveform and connected to enable said intercoupling means for controlling the duration and beginning and ending of the detecting time of said first and second gate-latches in synchronism with the waveform so that said gate-latch circuits will be alternately enabled for periods during which the waveform bits associated therewith should occur.

5. Apparatus for detecting transitions indicative of data and clock bits in a phase encoded waveform, comprising
- a first gate-latch circuit arrangement for providing indications of the data bits,
- a second gate-latch circuit arrangement for providing indications of the clock bits,
- means for supplying the waveform to said first and second gate-latches,
- means for intercoupling said first and second gate-latches to permit only one of the gate-latches to be operative for detecting a transition at a particular time,
- variable gate control circuit means responsive to the waveform and connected to enable said intercoupling means for controlling the duration and beginning and ending of the detecting time of said first and second gate-latches in synchronism with the waveform so that said gate-latch circuits will be alternately enabled for periods during which the waveform bits associated therewith should occur, said intercoupling means being constructed and arranged for preventing the enabling of either of said gate-latch circuits until completion of a transition detection that has already been initiated by the other said gate-latch circuit, and
- circuit means responsive to the phase of the waveform for sensing the phase of the data bits to provide indications of the binary significance thereof.

6. Detecting apparatus for recovering and segregating information from a raw data waveform having intermingled data and clock bits, comprising
- first and second gate-latch circuits each having set and reset inputs and at least an off indicating output,
- first and second AND inverter circuits having the outputs thereof coupled to the set input of said first and second gate-latch circuits, respectively,
- the off output of said first and second gate-latch circuits being coupled to provide one conditioning input to said first and second AND inverter circuits, respectively,
- means for coupling an indication of the absence of waveform bits in the raw data to the reset input of said gate-latch circuits, and
- gating control means coupled to provide conditioning inputs to said AND inverter circuits for enabling said first AND inverter circuit for a period during which a clock bit should occur and for enabling said second AND inverter for a period during which data bits should occur,
- whereby said first gate-latch circuit will respond to the absence of a bit in the raw data to provide an indication of the presence of a clock bit while said second gate-latch circuit will respond to the output of said second AND inverter and the absence of a bit in the raw data to provide an indication of the presence of a data bit.

7. The apparatus in accordance with claim 6 wherein said timing circuit is operated in synchronism with the clock bits present in said raw data, and which further includes means for detecting the phase of the bits present in said raw data for indicating the binary significance of the output produced from said second gate-latch circuit.

8. Detecting apparatus for recovering and segregating information from a raw data waveform having data and clock bits commingled therein, comprising
- first and second latch circuits having the reset inputs thereof coupled for commonly receiving said raw data waveform, the off output of said second latch being coupled for preventing the reset of said first latch from responding to a raw data bit when the reset of said second latch has initiated a response to said bit until said bit has terminated,
- timing means for providing a set input to said first latch during the time a clock bit should occur in said raw data to prevent said first latch from responding to said clock bit at the reset thereof, and
- means for connecting the set output from said first latch to the set input of said second latch so that second latch will not have a set input while a set input is introduced to said first latch but will have a set input while the set input is removed from said first latch, the said first and second latches, when the set input is removed therefrom, normally responding to a raw data bit at the reset thereof to provide an output indication of data bits and clock bits, respectively,
- whereby, after detection of a given data bit has been commenced, said first latch will not respond to a reapplication of a set input thereto and will not remove the set input from said second latch until after said given data bit has terminated.

9. Detecting apparatus for recovering and segregating information from an input waveform containing commingled clock and data bits, comprising
- timing circuit means for providing an output pulse indicative of the beginning of the period during which a clock bit should occur in said waveform,
- first and second latch circuits, the output pulse of said timing circuit means being coupled to reset said first latch circuit,
- first and second gating means,
- said first gating means being arranged to respectively couple the on and off outputs of said first latch to the set and reset inputs of said second latch in response to the absence of an input waveform bit, said second gating means being coupled to the on and off outputs of said second latch for responding to the presence of an input waveform bit to provide an indication of the presence of a data bit when said second latch is in one condition and the presence of a clock bit when said second latch is in the other condition,
- the clock bit output from said second gating means being coupled to provide a set input to said first latch,
- whereby the presence of a clock bit will cause said first latch to be set and will condition said first and second gating means and said second latch to respond to data bits for providing an output indicative thereof, whereas said timing circuit means will condition said first latch so that said gating means and said second latch will respond to the presence of a clock bit to provide an indication thereof.

(References on following page)

References Cited

UNITED STATES PATENTS

| | | | |
|---|---|---|---|
| 2,700,149 | 1/1955 | Stone | 328—119 X |
| 3,092,814 | 6/1963 | Hoagland | 328—119 X |
| 3,110,866 | 11/1963 | Maure et al. | 328—119 X |
| 3,114,899 | 12/1963 | Gabor | 340—174.1 |
| 3,265,974 | 8/1966 | Thomas | 328—119 X |

OTHER REFERENCES

IBM Technical Disclosure Bulletin, Clock and Data Retrieval Circuit, by Fang et al., vol. 5, No. 11, April 1963.

JOHN S. HEYMAN, Primary Examiner

U.S. Cl. X.R.

307—215, 217, 218, 290; 328—72, 119; 340—172.5

930-4008-00D
PO-1050
(5/69)

UNITED STATES PATENT OFFICE
CERTIFICATE OF CORRECTION

Patent No. 3,491,303 Dated January 20, 1970

Inventor(s) A. M. Gindi

It is certified that error appears in the above-identified patent and that said Letters Patent are hereby corrected as shown below:

Column 1, line 36, change "Electric" to --Electrical--.

Column 1, lines 48 and 49, delete "from the auxiliary tran sitions indicating another form of information".

Column 3, line 31, change "interconnected to --interconnec

Column 4, line 30, change "block" to --clock--.

Column 5, line 23, change "comprensates" to --compensates-

Column 5, lines 39 and 40, delete "data waveforms, such as the phase encoded waveform matically detected by this circuit" and insert --data waveform. If one is missed then the next is automatically detected by this circuit.-- therefor.

Column 10, line 30, change "recoversing" to --recovering--

Column 10, line 37, change "transistions" to --transitions

Column 10, line 56, change "transistions" to --transitions

SIGNED AND
SEALED
JUL 7 1970

(SEAL)
Attest:

Edward M. Fletcher, Jr.
Attesting Officer

WILLIAM E. SCHUYLER, JR.
Commissioner of Patents